(12) United States Patent
Chopra et al.

(10) Patent No.: US 10,509,587 B2
(45) Date of Patent: Dec. 17, 2019

(54) SYSTEM AND METHOD FOR HIGH PRIORITY BACKUP

(71) Applicant: EMC IP Holding Company LLC, Hopkinton, MA (US)

(72) Inventors: Shelesh Chopra, Bangalore (IN); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 93 days.

(21) Appl. No.: 15/960,715

(22) Filed: Apr. 24, 2018

(65) Prior Publication Data
US 2019/0324653 A1 Oct. 24, 2019

(51) Int. Cl.
*G06F 3/06* (2006.01)
*G06F 12/0866* (2016.01)
*H04L 29/08* (2006.01)
*G06F 12/0888* (2016.01)

(52) U.S. Cl.
CPC ........... *G06F 3/065* (2013.01); *G06F 3/0604* (2013.01); *G06F 3/067* (2013.01); *G06F 3/0641* (2013.01); *G06F 3/0659* (2013.01); *G06F 12/0866* (2013.01); *G06F 12/0888* (2013.01); *H04L 67/1008* (2013.01)

(58) Field of Classification Search
CPC ............. H04L 67/1002; H04L 67/1008; H04L 67/2842; G06F 9/5083; G06F 9/5027; G06F 9/5011; G06F 3/065; G06F 3/0604; G06F 3/0641; G06F 3/0659; G06F 3/067
See application file for complete search history.

(56) References Cited

U.S. PATENT DOCUMENTS

| | | | |
|---|---|---|---|
| 5,493,689 A | 2/1996 | Waclawsky et al. |
| 5,606,693 A | 2/1997 | Nilsen et al. |
| 5,668,986 A | 9/1997 | Nilsen et al. |
| 6,298,451 B1 | 10/2001 | Lin |

(Continued)

FOREIGN PATENT DOCUMENTS

EP 2677721 A1 12/2013

OTHER PUBLICATIONS

Slota et al. "Prediction and load balancing system for distributed storage." Scalable Computing: Practice and Experience 11.2 (2010): 121-130. (Year: 2010).*

(Continued)

*Primary Examiner* — Charles Rones
*Assistant Examiner* — Hewy H Li
(74) *Attorney, Agent, or Firm* — Chamberlain, Hrdlicka, White, Williams & Aughtry

(57) ABSTRACT

A coordination point for assigning clients to remote backup storages includes a persistent storage and a processor. The persistent storage stores gateway pool cache capacities of the remote backup storages. The processor obtains a data storage request for data from a client of the clients; obtains an indirect cache estimate for servicing the data storage request; selects a remote backup storage of the remote backup storages based on the obtained indirect cache estimate using the gateway pool cache capacities; and assign the selected remote backup storage to service the data storage request. The selected remote backup storage has a higher client load at a time selection than a second client load of a second remote backup storage of the remote backup storages.

20 Claims, 10 Drawing Sheets

(56) References Cited

U.S. PATENT DOCUMENTS

| | | |
|---|---|---|
| 6,421,317 B1 | 7/2002 | Denecheau et al. |
| 6,665,812 B1 | 12/2003 | Blumenau et al. |
| 6,826,711 B2 | 11/2004 | Moulton et al. |
| 7,246,207 B2 | 7/2007 | Kottomtharayil et al. |
| 7,263,529 B2 | 8/2007 | Cordery et al. |
| 7,302,450 B2 | 11/2007 | Benedetti et al. |
| 7,315,923 B2 | 1/2008 | Retnamma et al. |
| 7,343,453 B2 | 3/2008 | Prahlad et al. |
| 7,346,686 B2 | 3/2008 | Albert et al. |
| 7,664,847 B2 | 2/2010 | Colrain et al. |
| 7,954,143 B2 | 5/2011 | Aaron |
| 8,156,086 B2 | 4/2012 | Lu et al. |
| 8,156,502 B1 | 4/2012 | Blanding |
| 8,209,696 B2 | 6/2012 | Ferguson et al. |
| 8,375,396 B2 | 2/2013 | Pooni et al. |
| 8,387,054 B1 | 2/2013 | Zeis et al. |
| 8,412,900 B1 | 4/2013 | Sano et al. |
| 8,458,210 B2 | 6/2013 | Arifuddin et al. |
| 8,549,247 B2 | 10/2013 | Satoyama et al. |
| 8,578,120 B2 | 11/2013 | Attarde et al. |
| 8,695,012 B2 | 4/2014 | Kanso et al. |
| 8,782,256 B2 | 7/2014 | Dec et al. |
| 8,965,921 B2 | 2/2015 | Gajic |
| 8,972,326 B2 | 3/2015 | Prathaban et al. |
| 9,069,482 B1 | 6/2015 | Chopra et al. |
| 9,141,435 B2 | 9/2015 | Wein |
| 9,172,750 B2 | 10/2015 | Bulkowski et al. |
| 9,489,270 B2 | 11/2016 | Anglin et al. |
| 9,519,432 B1 | 12/2016 | Haustein et al. |
| 9,672,116 B1 | 6/2017 | Chopra et al. |
| 9,838,332 B2 | 12/2017 | Smith |
| 10,013,189 B1 | 7/2018 | Yang et al. |
| 10,250,488 B2 | 4/2019 | Cropper et al. |
| 2001/0054095 A1 | 12/2001 | Kampe et al. |
| 2004/0153708 A1 | 8/2004 | Joshi et al. |
| 2004/0186844 A1 | 9/2004 | Muhlestein |
| 2005/0010727 A1* | 1/2005 | Cuomo ............... G06F 16/9574 711/138 |
| 2005/0033818 A1 | 2/2005 | Jardin |
| 2005/0149940 A1 | 7/2005 | Calinescu et al. |
| 2007/0180314 A1 | 8/2007 | Kawashima et al. |
| 2007/0198797 A1 | 8/2007 | Kavuri et al. |
| 2007/0220319 A1 | 9/2007 | Desai |
| 2008/0115190 A1 | 5/2008 | Aaron |
| 2008/0222297 A1 | 9/2008 | Mengerink |
| 2009/0144388 A1* | 6/2009 | Gross .................. G06F 12/0813 709/213 |
| 2009/0164832 A1 | 6/2009 | Kanso et al. |
| 2010/0017445 A1 | 1/2010 | Kobayashi |
| 2011/0022812 A1 | 1/2011 | van der Linden et al. |
| 2011/0153941 A1* | 6/2011 | Spatscheck ........... G06F 9/5083 711/119 |
| 2012/0059934 A1* | 3/2012 | Rafiq .................. H04L 67/1008 709/225 |
| 2012/0117028 A1 | 5/2012 | Gold et al. |
| 2014/0025796 A1 | 1/2014 | Vibhor |
| 2014/0089511 A1 | 3/2014 | Mclean |
| 2014/0211698 A1 | 7/2014 | Aguirre et al. |
| 2014/0297611 A1 | 10/2014 | Abbour et al. |
| 2014/0304412 A1 | 10/2014 | Prakash et al. |
| 2014/0337285 A1 | 11/2014 | Gokhale et al. |
| 2015/0067353 A1 | 3/2015 | Hui |
| 2015/0067354 A1 | 3/2015 | Hui |
| 2015/0286519 A1 | 10/2015 | Huang et al. |
| 2016/0092311 A1 | 3/2016 | Bushman |
| 2017/0371562 A1 | 12/2017 | Delaney et al. |

OTHER PUBLICATIONS

"Defenders of the Virtual World"; EMC Corporation, EMC Backup, Recovery & Archive Solutions, Backup Recovery Systems Division; Jun. 7, 2012 (59 pages).

"EMC® NetWorker® Module for Microsoft for Exchange Server VSS, Release 8.2, User Guide"; EMC Corporation; 2014 (150 pages).

Extended European Search Report issued in corresponding Application No. EP19169660.8, dated Aug. 30, 2019. (8 pages).

* cited by examiner

SYSTEM AND METHOD FOR HIGH PRIORITY BACKUP

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, a coordination point for assigning clients to remote backup storages in accordance with one or more embodiments of the invention includes a persistent storage and a processor. The persistent storage stores gateway pool cache capacities of the remote backup storages. The processor obtains a data storage request for data from a client of the clients; obtains an indirect cache estimate for servicing the data storage request; selects a remote backup storage of the remote backup storages based on the obtained indirect cache estimate using the gateway pool cache capacities; and assign the selected remote backup storage to service the data storage request. The selected remote backup storage has a higher client load at a time selection than a second client load of a second remote backup storage of the remote backup storages.

In one aspect, a method of operating a coordination point for assigning clients to remote backup storages in accordance with one or more embodiments of the invention includes obtaining a data storage request for data from a client of the clients; obtaining an indirect cache estimate for servicing the data storage request; selecting a remote backup storage of the remote backup storages based on the obtained indirect cache estimate using gateway pool cache capacities of the remote backup storages; and assigning the selected remote backup storage to service the data storage request. The selected remote backup storage has a higher client load at a time of its selection than a second client load of a second remote backup storage of the remote backup storages.

In one aspect, a non-transitory computer readable medium in accordance with one or more embodiments of the invention includes computer readable program code, which when executed by a computer processor enables the computer processor to perform a method for assigning clients to remote backup storages, the method includes obtaining a data storage request for data from a client of the clients; obtaining an indirect cache estimate for servicing the data storage request; selecting a remote backup storage of the remote backup storages based on the obtained indirect cache estimate using gateway pool cache capacities of the remote backup storages; and assigning the selected remote backup storage to service the data storage request. The selected remote backup storage has a higher client load at a time of its selection than a second client load of a second remote backup storage of the remote backup storages.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
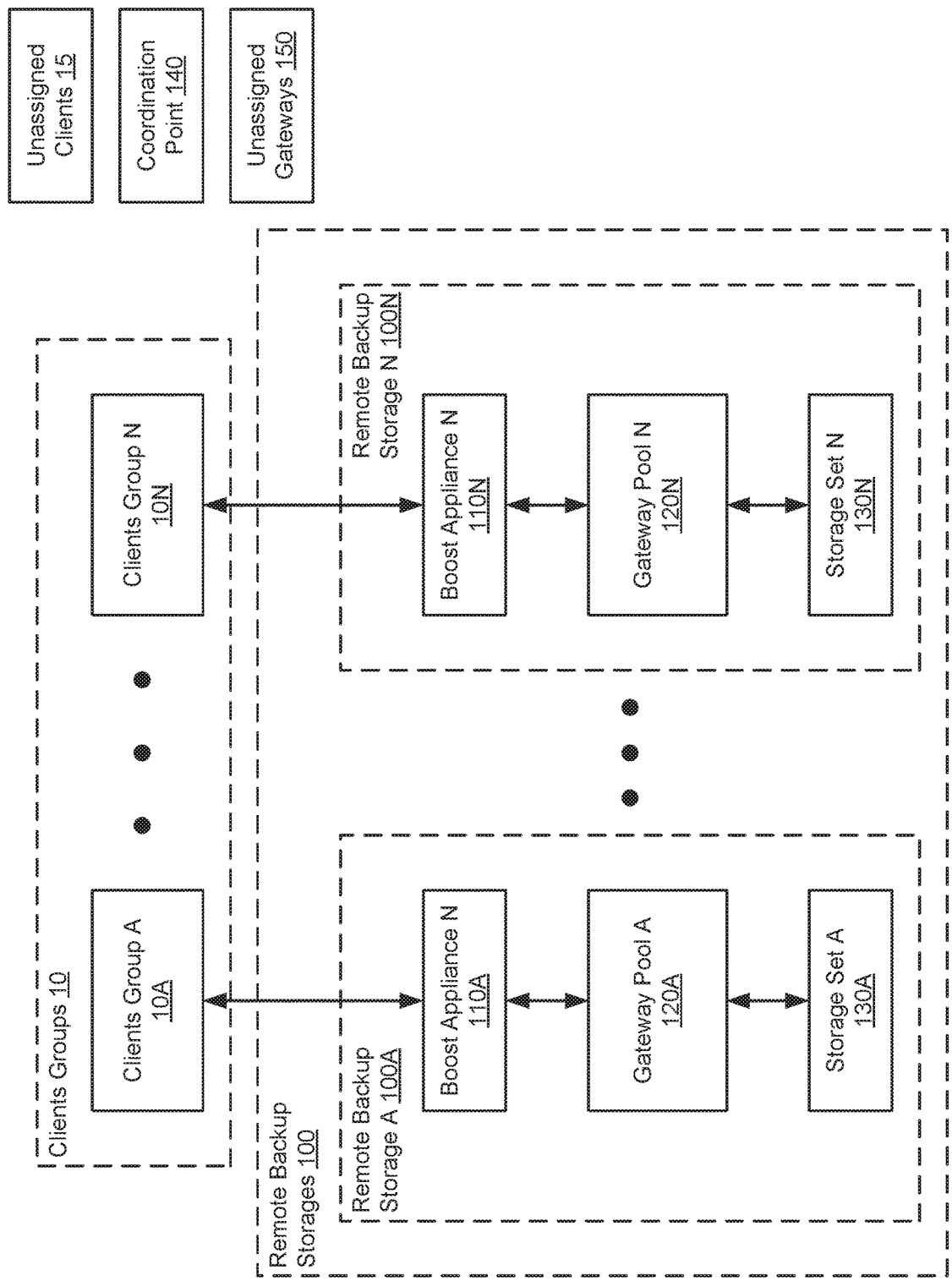
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. Managing the data may include storing data from clients in storages. The storages may be remote from the clients, e.g., remote backup storages. For example, the storages may be operably connected to the clients via a network. Different storages may service the data storage needs of different clients, e.g., a storage may only provide data storage services to a portion of the clients, e.g., a client group.

In one or more embodiments of the invention, the storages may be deduplicated storages. The deduplicated storages may utilize a distributed cache stored on a pool of gateways to the storages. Fingerprints of data, stored in the deduplicated storages, may be stored in the distributed cache and thereby enable newly obtained data to be deduplicated without accessing the data stored in the deduplicated storages.

In one or more embodiments of the invention, the system may assign and/or reassign gateways to gateway pools dynamically. Due to different client loads, gateway pools serving different client groups may require different quantities of cache to perform deduplication. By dynamically assigning and/or reassigning gateways, the system may decrease the likelihood that a gateway pool would have insufficient cache to service an associated client group. As will be discussed in greater detail below, in a scenario in which a gateway pool has insufficient cache to perform deduplication using only data stored in the cache the computational cost of performing deduplication increases substantially. Accordingly, one or more embodiments of the invention may decrease the computation cost of operating a deduplicated storage by ensuring that associated gateway pools have sufficient cache to perform deduplication.

As used herein, computing resources refer to processor computing cycles, communication bandwidth, transitory storage input-output cycles, persistent storage input-output cycles, and/or transitory or persistent memory storage capacity. Transitory storage may be provided by, for example, random access memory. Persistent storage memory may be provided by, for example, a solid state hard disk drive. Processor computing cycles may be provided by, for example, a central processing unit. Communication bandwidth may be provided by, for example, a network interface card.

In one or more embodiments of the invention, the system may assign and/or reassign gateways based on indirect estimated cache requirements of the clients. Due to data security concerns, it may not be possible to directly use client data to estimate cache requirements of the clients. In one or more embodiments of the invention, the system estimates a cache requirement of the client using an indirect method and, thereby, enables a cache estimate to be generated without interrogating client data. In contrast, a direct cache estimate may be based on characteristics of the client data to be stored in a storage.

FIG. 1 shows an example system in accordance with one or more embodiments of the invention. The system may include client groups (10) that store data in remote backup storages (100). Each client group may include any number of clients. Each of the remote backup storages (100A, 100N) may provide data storage services to different client groups (10A, 10N). The system may further include a coordination point (140) that assigns unassigned clients (15) to client groups (10). The unassigned clients (15) may include any number of clients. By assigning the unassigned clients (15) to client groups (10), the coordination point selects a remote backup storage (100A, 100N) that will provide data storage services to the unassigned clients (15). The coordination point (140) may also assign unassigned gateways (150) or assigned gateways (e.g., 120A, 120B) to remote backup storages (e.g., 100A, 100N). When the gateways assigned to a remote backup storage may cooperate to host a distributed cache. The distributed cache may be used to facilitate the efficient storage of data in storage sets (e.g., 130A, 130N). Each of the components of the example system may be operably connected via any combination of wired and wireless connections. Each component of the system is discussed below.

The clients of the client groups (10) and the unassigned clients (15) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients may be other types of computing devices without departing from the invention.

The clients of the client groups (10) may be programmed to store data in the remote backup storages (100). By storing data in the remote backup storages (100), the clients may store backup copies of data and/or reduce the storage utilization rate of the clients.

In one or more embodiments of the invention, the clients store a copy of all or a portion of the respective client's data in the remote backup storages (100). In other words, the remote backup storages (100) may be used to store a copy of the client's data.

In one or more embodiments of the invention, the clients store data in the remote backup storages (100) without storing a copy of the data locally. In other words, rather than storing data to a local storage, the clients may store data in the remote backup storages (100) and thereby store the data without using local data storage resources of the client. For additional details regarding the client groups (10), See FIG. 2A.

In one or more embodiments of the invention, each unassigned client (15) may be assigned to a client group (10A, 10N) and programmed to store data in a remote backup storage (100A, 100N) that provides data storage services to the assigned client group. Each client may receive a respective assignment and programming from the coordination point (140). Each unassigned client (15) may be assigned and programmed by the coordination point (140) when the respective unassigned client (15) requests to store data in a remote backup storage (100). Each unassigned client (15) may be assigned at other times, e.g., when first joining the system of FIG. 1, without departing from the invention.

While each client group (10A, 10N) is illustrated as being serviced, i.e., provided data storage services by a separate remote backup storages (100A, 100N) in FIG. 1, a client group may be serviced by multiple remote backup storages without departing from the invention. For example, a client group may be serviced by multiple remote backup storages. In such a scenario, the storage needs of the client group may be dynamically balanced against the service load on each of the remote backup storages assigned to service the client group. Based on the balancing, the client group may be serviced by any of the assigned remote backup storages to balance the service load across the remote backup storages assigned to service the client group.

As discussed above, the client groups (10) may store data in the remote backup storages (100). The remote backup storages (100) may provide data storage services to client groups. The remote backup storages (100) may perform the method illustrated in FIG. 5 when providing data storage services to the client groups. Each remote backup storage (e.g., 110A, 100N) may include a boost appliance (110A, 110N), a gateway pool (120A, 120N), and a storage set (130A, 130N). Each component of the remote backup storages is discussed below.

In one or more embodiments of the invention, the gateways of the gateway pools (120A, 120N) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The gateways of the gateway pools (120A, 120N) may be other types of computing devices without departing from the invention.

In one or more embodiments of the invention, the gateways of the gateway pools (120A, 120N) are distributed computing devices. As used herein, a distributed computing device refers to functionality provided by a logical device that utilizes the computing resources of one or more separate and/or distinct computing devices. For example, in one or more embodiments of the invention, the gateways of the gateway pools (120A, 120N) may be distributed devices that include components distributed across a number of separate and/or distinct computing devices. In such a scenario, the functionality of the gateways of the gateway pools (120A, 120N) may be performed by multiple different computing devices without departing from the invention.

In one or more embodiments of the invention, each of the gateways of the gateway pools (120A, 120N) may cooperate with other gateways of the respective pool to provide the functionality of the gateway pools (120A, 120N) described throughout this application. In other words, each gateway of a respective pool may service data storage/access requests from clients assigned to the respective pool, e.g., to service a corresponding client group (10A, 10N).

In one or more embodiments of the invention, the gateway pools (120A, 120N) manage client data. The gateway pools (120A, 120N) may manage client data by receiving requests to store or obtain data from the clients (10). In response to the requests, the gateway pools (120A, 120N) may take appropriate action to service the aforementioned storage/access requests from the clients. In one or more embodiments of the invention, each gateway pool may host a distributed cache. The distributed cache may be used to store/provide data without accessing a storage set. For additional details regarding the gateway pools (120A, 120N), See FIG. 2B.

The gateway pools (120A, 120N) may store client data in respective storage sets (130A, 130N). Each of the storage sets (130A, 130N) may be a collection of devices that include physical data storage resources such as, for example, hard disk drives, solid state drives, tape drives, etc.

In one or more embodiments of the invention, the storage sets (130A, 130N) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The storage sets (130A, 130N) may be other types of computing devices without departing from the invention.

In one or more embodiments of the invention, the storage sets (130A, 130N) are distributed computing devices. As used herein, a distributed computing device refers to functionality provided by a logical device that utilizes the computing resources of one or more separate and/or distinct computing devices. For example, in one or more embodiments of the invention, the storage sets (130A, 130N) may be distributed devices that include components distributed across a number of separate and/or distinct computing devices. In such a scenario, the functionality of the storage sets (130A, 130N) may be performed by multiple different computing devices without departing from the invention.

The storage sets (130A, 130N) may store client data or provide previously stored client data. The storage sets (130A, 130N) may store or provide client data in response to requests from the gateway pools (120A, 120N). In response to the requests, the storage sets (130A, 130N) may take appropriate action to service the aforementioned storage/access requests from the gateway pools. In some embodiments of the invention, the storage sets (130A, 130N) may also store data received directly from the client groups (10) or provide stored data directly to the client groups (10). For example, the gateway pools (120A, 120N) may orchestrate such a scenario to decrease a load on the respective gateway pool tasked with servicing a data storage/access request from a client. For additional details regarding the storage sets (130A, 130N), See FIG. 2D.

While the storage sets (130A, 130N) are illustrated as being operably connected to separate gateway pools (120A, 120N), multiple storage sets may be operably connected to any combination of gateway pools without departing from the invention. In other words, a storage sets may provide storage services for any number gateway pools.

In one or more embodiments of the invention, the boost appliances (110A, 110N) may facilitate communications between a client group (e.g., 10A, 10N) and a gateway pool (e.g., 120A, 120N) of the remote backup storage that provides data storage services to the client group.

In one or more embodiments of the invention, the boost appliances (110A, 110N) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The boost appliances (110A, 110N) may be other types of computing devices without departing from the invention.

In one or more embodiments of the invention, the boost appliances (110A, 110N) are distributed computing devices. As used herein, a distributed computing device refers to functionality provided by a logical device that utilizes the computing resources of one or more separate and/or distinct computing devices. For example, in one or more embodiments of the invention, the boost appliances (110A, 110N) may be distributed devices that include components distributed across a number of separate and/or distinct computing devices. In such a scenario, the functionality of the boost appliances (110A, 110N) may be performed by multiple different computing devices without departing from the invention.

As discussed above, the gateway pools (120A, 120N) may manage client data. In one or more embodiments of the invention, the coordination point (140) assigns clients to remote backup storages (110) to service the assigned clients. The coordination point (140) may make the assignments of the clients based on an indirect cache estimate of data to be stored by the clients. In one or more embodiments of the invention, an indirect cache estimate is not based on characteristics of the client data to be stored in a storage. Rather, an indirect cache estimate may be based on characteristics of a client that is requesting to store data in the storage. Consequently, embodiments of the invention may enable cache estimates to be generated without interrogating the to be stored data. By doing so, security of the client data may be improved by reducing the number of components that accesses the client data.

In one or more embodiments of the invention, the indirect cache estimate is based on one or more of: (i) a type of the application that generated the client data (e.g., database manager, email exchange, word processor, etc.), (ii) a transaction rate of the application that generated the client data (e.g., iops of storage used by the application), (iii) a computing resource capacity of the computing device that generated the client data (e.g., available processing capacity, available storage space, available memory, etc.), and (iv) the bandwidth between the client and the storage (e.g., the average bandwidth, the minimum bandwidth, etc.). The indirect cache estimate may be based on other characteristics of the client that generated the client data or the application that generated the client data without departing from the invention.

In one or more embodiments of the invention, the coordination point (140) assigns gateways to gateway pools of remote backup storages. The coordination point (140) may assign unassigned gateways (150) or reassign gateways that are already assigned to a gateway pool (e.g., 120A, 120N). By assigning gateways to the gateway pools, the coordination point (140) may distribute resources to meet the needs of the client groups (10). For example, if a remote backup storage has insufficient available cache in a hosted distributed cache to meet the cache needs for a client group, the remote backup storage may provide a poor quality of storage service to the client group. Storing and/or providing data to the client group may take significantly longer and consumer a much larger quantity of computing resources when compared to a remote backup storage that provide storage services to a client group for which it has sufficient cache capacity in its hosted distributed cache. Since clients may dynamically change their cache requirements depending on the generated client data, the cache required to service the data storage needs of the clients may change dynamically. Embodiments of the invention may provide a method for dynamically modifying the cache in each gateway pool (e.g., 120A, 120N) to meet the dynamically changing needs of the clients.

In one or more embodiments of the invention, the coordination point (140) is a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and the methods illustrated in FIGS. 4A-4E. The coordination point (140) may be other types of computing devices without departing from the invention.

In one or more embodiments of the invention, the coordination point (140) is a distributed computing device. For example, the coordination point (140) may be a distributed device that includes components distributed across a number of separate and/or distinct computing devices. In such a scenario, the functionality of the coordination point (140) may be performed by multiple different computing devices without departing from the invention. For additional details regarding the coordination point (140), See FIG. 3.

To further explain the operation of components of the system, FIGS. 2A-2D show diagrams of examples of components of the system of FIG. 1. While these diagrams illustrate portions of the components of the system, each of the components of the system may include additional, fewer, or different portions without departing from the invention.

To further explain the operation of components of the system, FIGS. 2A-2E and 3 show diagrams of examples of components of the system of FIG. 1. While these diagrams illustrate portions of the components of the system, each of the components of the system may include additional, fewer, or different portions without departing from the invention.

Figure 2A:
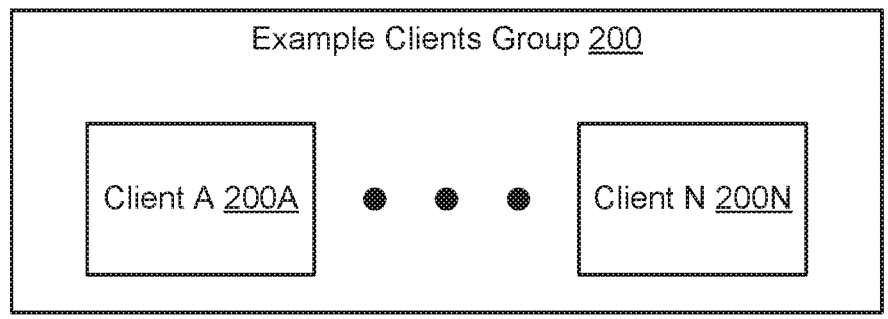
FIG. 2A shows a diagram of an example of a clients group in accordance with one or more embodiments of the invention.

FIG. 2A shows a diagram of an example client group (200) in accordance with one or more embodiments of the invention. The example client group (200) includes clients (200A, 200N). The example client group (200) may include any number of clients without departing from the invention.

The example client group (200) may be serviced by a remote backup storage. In other words, a remote backup storage may provide data storage services to each client of the example client group (200).

Figure 2B:
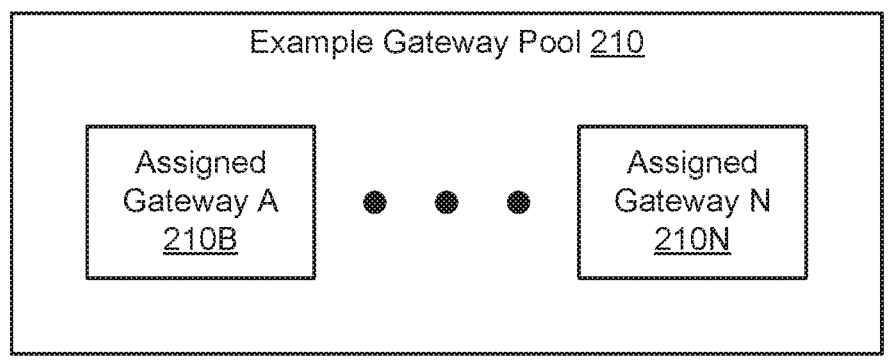
FIG. 2B shows a diagram of an example gateway pool in accordance with one or more embodiments of the invention.

As discussed above, each client group may be serviced by a gateway pool of a remote backup storage. FIG. 2B shows a diagram of an example gateway pool (210) in accordance with one or more embodiments of the invention. The example gateway pool (210) includes gateways (210A, 210N). The example gateway pool (210) may include any number of gateways without departing from the invention. For additional details regarding individual gateways, See FIG. 2C.

Figure 2C:
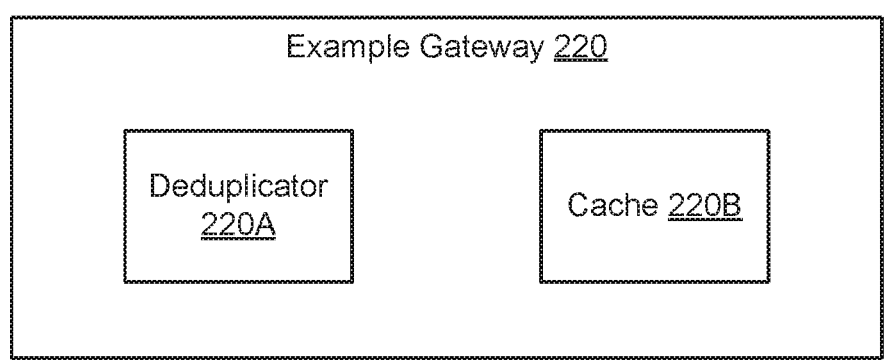
FIG. 2C shows a diagram of an example gateway in accordance with one or more embodiments of the invention.

FIG. 2C shows a diagram of an example gateway (220) in accordance with one or more embodiments of the invention. The example gateway (220) includes a deduplicator (220A) and a cache (220B). Each component of the example gateway (220) is discussed below.

The deduplicator (220A) may obtain client data and deduplicate it against client data already stored in a storage set. In one or more embodiments of the invention, deduplication means to compare to-be-stored data to already stored data and only store a portion of the to-be-stored data that is not identical to already stored data. By deduplicating data a larger quantity of data may be stored using the same quantity of storage. The deduplicator (220A) may perform deduplication using data stored in the cache (220B). As will be discussed below in greater detail, the cache (220B) may host a portion of a distributed cache distributed across all of the gateways of a gateway pool. When performing deduplication, the deduplicator (220A) may deduplicate the data against all of the fingerprints in the distributed cache.

To facilitate this functionality, the deduplicator (220A) of each gateway of a gateway pool may cooperate. For example, a deduplicator may first attempt to perform deduplication of the data against the portion of the distributed cache hosted by the cache (220B) of the gateway pool. If the partial deduplication indicates that the data is unique, a finger print of the data may be distributed to all, or a portion, of the other gateways of a gateway pool to attempt to identify whether the data is unique. Thus, embodiments of the invention may provide a two stage approach to deduplication that may consume fewer computational resources than only performing a complete, single step deduplication.

In one or more embodiments of the invention, the deduplicator (220A) is a hardware device. The hardware device may include circuitry. The hardware device may be, for example a programmable gate array, a digital signal processor, or an application specific integrated circuit. The deduplicator (220A) may be other hardware devices without departing from the invention.

In one or more embodiments of the invention, the deduplicator (220A) is implemented as instructions, stored on a persistent storage, that are executed by a processor or other programmable device. The processor or other programmable device may include circuitry. When executing the instructions, the processor or other programmable device may provide the functionality of the deduplicator (220A).

The cache (220B) may store data. The data may be fingerprints of client data stored in the storage set. The fingerprints may be, for example, a hashes of portions of the client data stored in the storage set. When performing deduplication, the deduplicator (220A) may generate a hash of client data and compare it to hashes in the cache (220B) to determine whether a copy of the client data is already stored in the storage set.

In one or more embodiments of the invention, the cache (220B) hosts a portion of a distributed cache. The distributed cache may be distributed across all of the gateways of a gateway pool. The distributed cache may include fingerprints of each piece of data stored in a storage set by any gateway of the gateway pool. The portion of the distributed cache hosted by the cache (220B) may only store a portion of the fingerprints of the distributed cache.

In one or more embodiments of the invention, the cache (220B) is a hardware device. The hardware device may include circuitry. The hardware device may be, for example a programmable gate array, a solid state drive, or another high performance memory device. The cache (220B) may be other hardware devices without departing from the invention.

In one or more embodiments of the invention, the cache (220B) is implemented as instructions, stored on a persistent storage, that are executed by a processor or other programmable device. The processor or other programmable device may include circuitry. When executing the instructions, the processor or other programmable device may provide the functionality of the cache (220B).

Figure 2D:
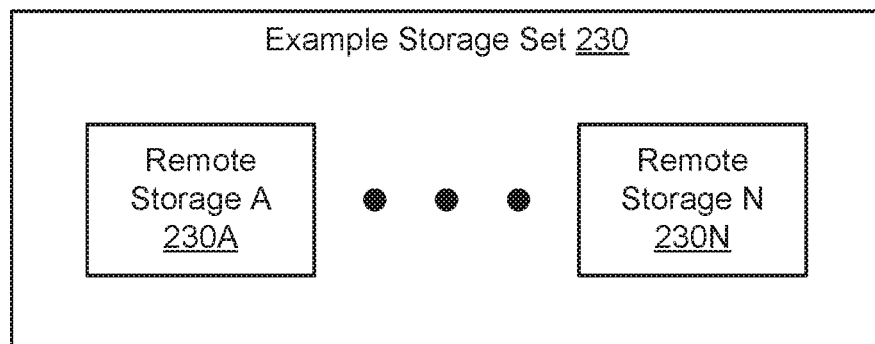
FIG. 2D shows a diagram of an example storage set in accordance with one or more embodiments of the invention.

As discussed above, the gateways may store data in storage sets. FIG. 2D shows a diagram of an example storage set (230) in accordance with one or more embodiments of the invention. The example storage set (230) may include any number of remote storages (230A, 230N). In one or more embodiments of the invention, a remote storage is a storage that is not co-located with the clients. Each of the remote storages (230A, 230N) may be physical or virtualized devices that provide storage services to the gateways of the gateway pools. For example, a first remote storage may be a server and a second remote storage may be a cloud resource, i.e., a logical device executing a cloud computing platform. For additional details regarding remote storages, See FIG. 2E.

Figure 2E:
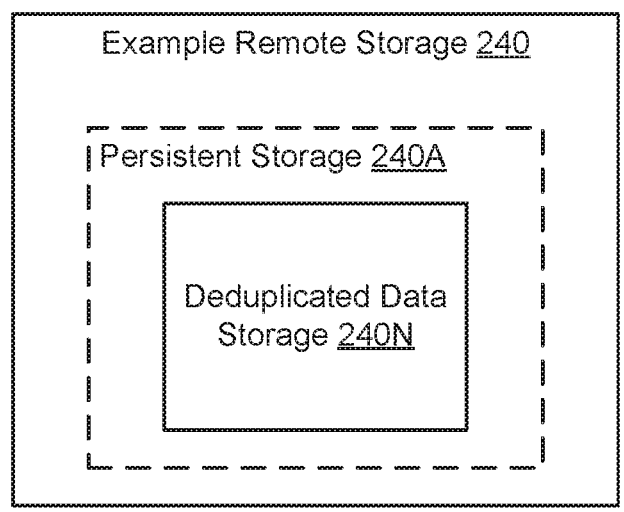
FIG. 2E shows a diagram of an example remote storage in accordance with one or more embodiments of the invention.

FIG. 2E shows a diagram of an example remote storage (240) in accordance with one or more embodiments of the invention. The example remote storage (240) may include a persistent storage (240A). The persistent storage (240A) may host a deduplicated data storage (240B). The example remote storage (240) may store deduplicated data received from the gateways in the deduplicated data storage (240B). The example remote storage (240) may provide data stored in the deduplicated data storage (240B) in response to data access requests from the gateways.

As discussed above, an example coordination point (300) may assign clients to remote backup storages and assign/remove gateways to/from remote backup storages.

Figure 3:
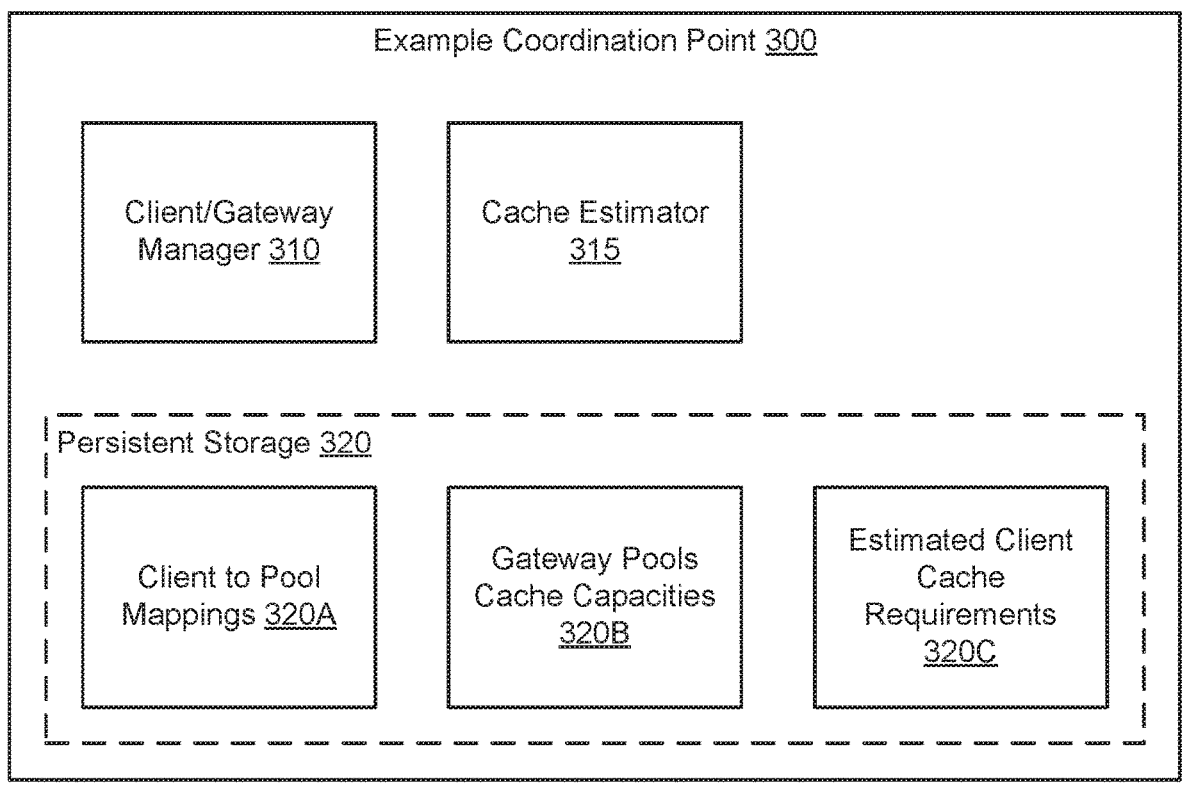
FIG. 3 shows a diagram of an example coordination point in accordance with one or more embodiments of the invention.

FIG. 3 shows a diagram of an example coordination point (300) in accordance with one or more embodiments of the invention. The example coordination point (300) may assign clients to be serviced by remote gateway storages by assigning them to different client groups that are serviced by corresponding remote backup storages. The example coordination point (300) may make the assignments based on indirect cache estimates for storing client data from the clients. Additionally, the example coordination point (300) may dynamically assign/reassign gateways to meet the cache requirements of clients being served by remote backup storages. To provide the aforementioned functionality, the example coordination point (300) may include a client/gateway manager (310), a cache estimator (315), and a persistent storage (320). Each component of the example coordination point (300) is discussed below.

The client/gateway manager (310) may manage both clients and gateways. The client/gateway manager (310) may manage the clients and gateways by assigning them to client groups and remote backup storages, respectively. The client/gateway manager (310) may make the assignments using data structures stored in the persistent storage (340), or other locations. To provide the aforementioned functionality, the client/gateway manager (310) may perform all or a portion of the methods shown in FIGS. 4A-5.

In one or more embodiments of the invention, the client/gateway manager (310) is a hardware device. The hardware device may include circuitry. The hardware device may be, for example a programmable gate array, a digital signal processor, or an application specific integrated circuit. The client/gateway manager (310) may be other hardware devices without departing from the invention.

In one or more embodiments of the invention, the client/gateway manager (310) is implemented as instructions, stored on a persistent storage, that are executed by a processor or other programmable device. The processor or other programmable device may include circuitry. When executing the instructions, the processor or other programmable device may provide the functionality of the client/gateway manager (310).

The cache estimator (315) may generate indirect cache estimates. The indirect cache estimates may be based on characteristics of the client that generated the client data rather than being based on the client data. To provide the aforementioned functionality, the cache estimator (315) may perform all or a portion of the methods shown in FIGS. 4A-5. In some embodiments of the invention, the cache estimator (315) may generate an indirect cache estimate in response to a request from the client/gateway manager (310).

In one or more embodiments of the invention, the cache estimator (315) is a hardware device. The hardware device may include circuitry. The hardware device may be, for example a programmable gate array, a digital signal processor, or an application specific integrated circuit. The cache estimator (315) may be other hardware devices without departing from the invention.

In one or more embodiments of the invention, the cache estimator (315) is implemented as instructions, stored on a persistent storage, that are executed by a processor or other programmable device. The processor or other programmable device may include circuitry. When executing the instructions, the processor or other programmable device may provide the functionality of the cache estimator (315).

The persistent storage (320) may be one or more physical or virtual storage devices. A physical storage device may be, for example, a hard disk drive, a solid state drive, a tape drive, etc. A virtual storage device may be a logical entity that utilizes the computing resources of one or more physical devices.

The persistent storage (320) may store client to pool mappings (320A), gateway pools cache capacities (320B), and estimated client cache requirements (320C). The persistent storage may store additional data structures without departing from the invention. Each of the aforementioned data structures are discussed below.

The client to pool mappings (320A) may specify memberships of client groups. In other words, the client to pool mappings (320A) may specify to which client group each client, assigned by a coordination point, belongs. The client to pool mappings (320A) may include identifiers of clients groups that are associated with identifiers of clients that are members of the client group. The client to pool mappings (320A) may include any number of the aforementioned associations. While the client to pool mappings (320A) have been described as specify associations between various identifiers, the client to pool mappings (320A) may specify the membership of each client group via other methods without departing from the invention.

In one or more embodiments of the invention, the coordination point updates the client to pool mappings (320A) when the coordination point assigns a client to a client pool. The coordination point may update the client to pool mappings (320A) by storing an identifier of the assigned client in the client to pool mappings (320A) and associating the stored identifier with an identifier of the client group to which the client was assigned.

The gateway pools cache capacities (320B) may specify the quantity of cache in a gateway pool. In other words, the gateway pools cache capacities (320B) may specify the capacity of each distributed cache of each respective gateway pool. The gateway pools cache capacities (320B) may specify: (i) the total capacity of the distributed cache, (ii) the available capacity of the distributed cache, and/or (iii) the historical data representing changes to the total capacity/available capacity of the distributed cache over time. A coordination point may use the gateway pools cache capacities (320B) when selecting a remote backup storage to assign to service a client.

In one or more embodiments of the invention, the coordination point updates the gateway pools cache capacities (320B) when a gateway is added or removed from a remote backup storage. The gateway pools cache capacities (320B) may be updated according to a schedule, or other metric, without departing from the invention.

The estimated client cache requirements (320C) may include cache estimates generated by the cache estimator (315). In other words, as indirect cache estimates are generated by the cache estimator (315), the generated indirect cache estimates may be stored in the estimated client cache requirements (320C). Doing so may generate a historical repository of cache estimates for each client. These estimates may be utilized by the example coordination point (300) when assigning a client to a client pool or assigning a gateway to a gateway pool.

While the data structures illustrated in FIG. 3 are shown as separate structures, the data structures may be stored in other formats, may be divided into multiple data structures, may be combined with the aforementioned or other data structures, and/or portion of the data structures may be distributed across multiple computing devices without departing from the invention.

As discussed above, the coordination point (140, FIG. 1) may remote backup storages to service client storage requests based on indirect cache estimates. FIGS. 4A-4D show methods in accordance with one or more embodiments of the invention to perform the assignments. One of ordinary skill will appreciate that some or all of these steps of the methods illustrated in FIGS. 4A-4D may be executed in different orders, may be combined or omitted, and some or all of the steps may be executed in parallel.

Figure 4A:
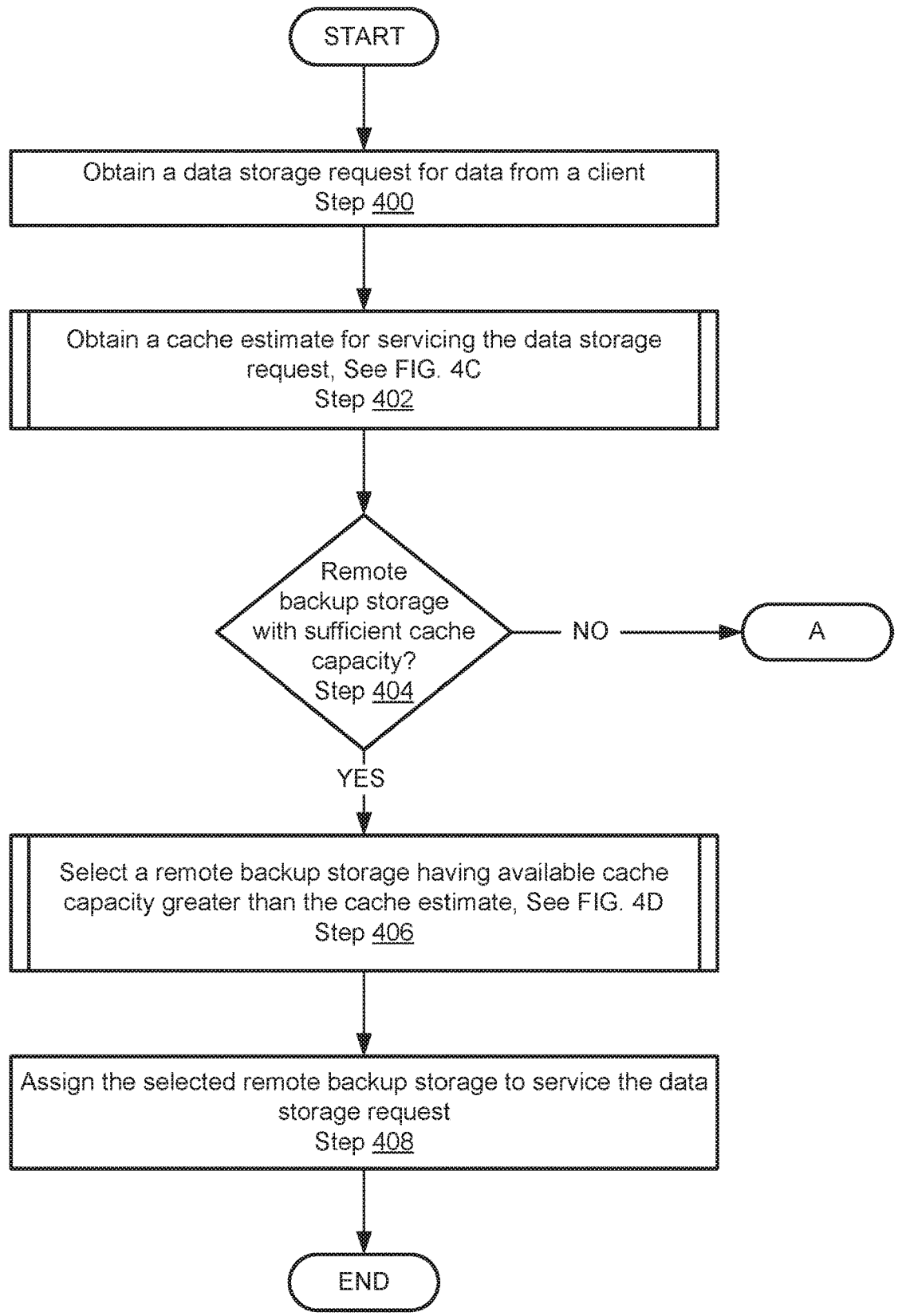
FIG. 4A shows a flowchart of a method of assigning remote backup storages to service data storage requests in accordance with one or more embodiments of the invention.

FIG. 4A shows a flowchart of a method in accordance with one or more embodiments of the invention. The method depicted in FIG. 4A may be used to assign a remote backup storage to service a client in accordance with one or more embodiments of the invention. The method shown in FIG. 4A may be performed by, for example, a coordination point (140, FIG. 1). Other component of the system illustrated in FIG. 1 may perform the method of FIG. 4A without departing from the invention.

In Step 400, a data storage request for data is obtained from a client.

In one or more embodiments of the invention, the data storage request is obtained directly from the client. For example, the client may send a message including the data storage request.

In one or more embodiments of the invention, the data storage request is obtained indirectly from the client. For example, the data storage request may be sent to a gateway pool which forwards the data storage request to the coordination point.

In one or more embodiments of the invention, the data is any type of data. For example, the data may be a database, a text document, an audio file, a video file, or any other type of data. The database may be one of multiple data base types. For example, a database type may be the model of the database, e.g., relational database, non-relational database, etc. For example, a first database may be relational database and a second database may be a non-relational database. The data may include any quantity of data without departing from the invention.

In one or more embodiments of the invention, the client is an unassigned client. In one or more embodiments of the invention, the client is a client of a client group, i.e., an assigned client.

In Step 402, a cache estimate for servicing the data storage request is obtained.

In one or more embodiments of the invention, the cache estimate is an indirect estimate not based on a content, size, or any other characteristic of the data of the data storage request. In one or more embodiments of the invention, the cache estimate is based on characteristics of the client that generated the data of the data storage request.

Figure 4B:
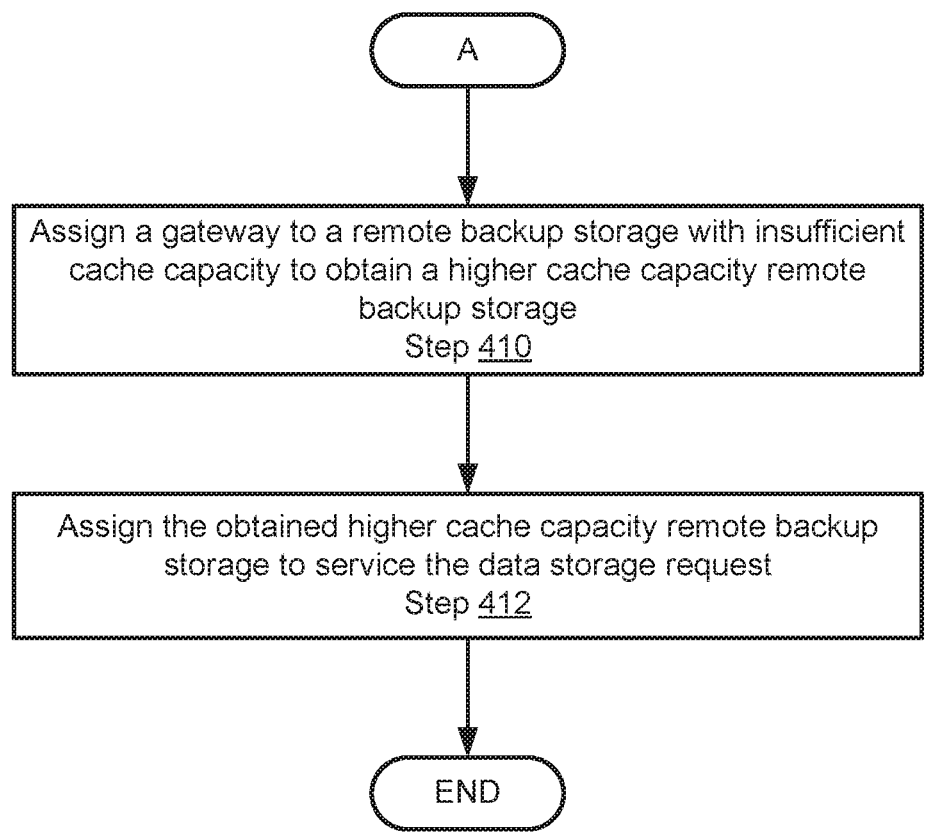
FIG. 4B shows a continuation of the flowchart of FIG. 4A.
Figure 4C:
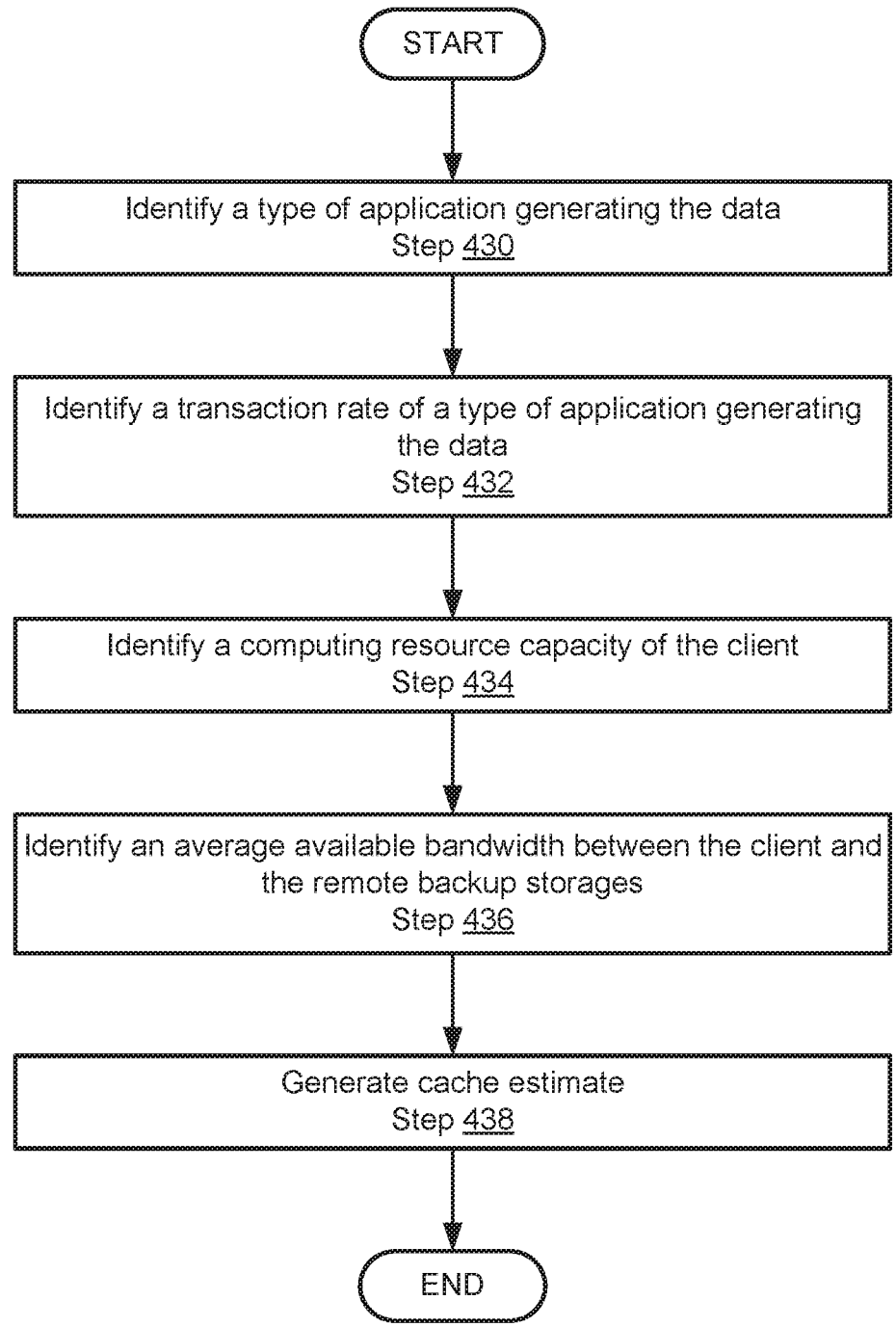
FIG. 4C shows a flowchart of a method of obtaining a cache estimate in accordance with one or more embodiments of the invention.

In one or more embodiments of the invention, the cache estimate is obtained via the method shown in FIG. 4C. The cache estimate may be obtained via other methods without departing from the invention.

In Step 404, it is determined whether a remote backup storage with sufficient cache capacity is available. If a remote backup storage with sufficient cache capacity is available, the method proceeds to Step 406. Otherwise, the method proceeds to Step 410 of FIG. 4B.

Returning to FIG. 4A, a remote backup storage has sufficient cache capacity if its available cache capacity is greater than the cache estimate of Step 402. In one or more embodiments of the invention, the determination is made by comparing the available cache capacity of each remote backup storage to the cache estimate. The comparison may be made in any order. If any remote backup storage has an available cache capacity greater than the cache estimate, the method may proceed to Step 406.

In one or more embodiments of the invention, the available cache capacity of each remote backup storage is obtained from a gateway pool cache capacities (e.g., 320B, FIG. 3) data structure. The available cache capacity of each remote backup storage may be obtained via other methods without departing from the invention.

In Step 406, a remote backup storage is selected that has a cache capacity greater than the cache estimate.

Figure 4D:
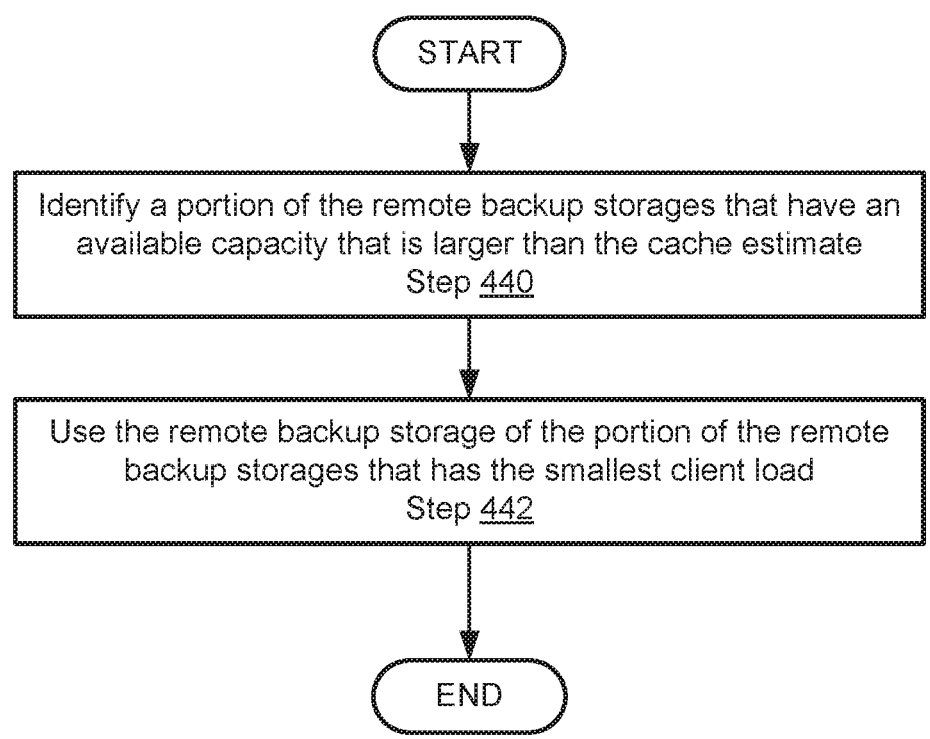
FIG. 4D shows a flowchart of a method of selecting a remote backup storage in accordance with one or more embodiments of the invention.

The remote backup storage may be selected via the method illustrated in FIG. 4D. The remote backup storage may be selected via other methods without departing from the invention.

In Step 408, the selected remote backup storage is assigned to service the data storage request. The method may end following Step 408.

FIG. 4B shows a continuation of the flowchart of FIG. 4A.

In Step 410, a gateway is assigned to a remote backup storage with insufficient cache capacity to obtain a higher cache capacity remote data storage.

In one or more embodiments of the invention, assigning the gateway to the remote backup storage includes distributing a distributed cache across the cache of the gateway. For example, the distributed cache may be expanded to utilize the cache of the newly added gateway.

In one or more embodiments of the invention, assigning the gateway to the remote backup storage includes distributing adding the cache of the gateway to a distributed cache without distributing portion of the existing distributed cache across the newly added cache. For example, the newly added cache to the distributed cache may be filled naturally in response to cache misses.

In Step 412, the higher cache capacity remote backup storage is assigned to service the data storage request. The method may end following Step 412.

FIG. 4C shows a flowchart of a method in accordance with one or more embodiments of the invention. The method depicted in FIG. 4C may be used to generate an indirect cache estimate associated with a client in accordance with one or more embodiments of the invention. The method shown in FIG. 4C may be performed by, for example, a coordination point (140, FIG. 1). Other component of the system illustrated in FIG. 1 may perform the method of FIG. 4C without departing from the invention.

In Step 430, a type of application generating the data of the data storage request is identified.

In one or more embodiments of the invention, the type of application may be identified by sending a request to a client executing the application. In response, the client may provide the type of the application. The type of the application may identify the application at a granular level or macro level. In one or more embodiments of the invention, a macro level refers to classes of applications that perform specific functions, e.g., databases, email servers, word processors, etc. In one or more embodiments of the invention, a granular level refers to a specific application, e.g., Microsoft® word.

In Step 432, a transaction rate of an application generating the data of the data storage request is identified.

In one or more embodiments of the invention, the transaction rate of the application may be identified by sending a request to a client executing the application. In response, the client may provide the transaction rate. The transaction rate may be, for example, the storage bandwidth, iops of the storage, or other metric the specifies the relative amount of storage used by the application.

In Step 434, a computing resource capacity of a client generating the data is identified.

In one or more embodiments of the invention, the computing resource capacity of the client may be identified by sending a request to the client generating the data. In response, the client may provide the computing resources of the client. The computing resources may be the processing power, storage, and/or memory of the client.

In Step 436, an average available bandwidth between the client and the remote backups storages is identified.

In one or more embodiments of the invention, the average available bandwidth is identified by monitoring the bandwidth by the coordination point, or another entity. The monitoring may be done at any level of granularity and in accordance with any schedule.

In Step 438, the cache estimate is generated using all or a part of the data obtained in Steps 430-436.

In one or more embodiments of the invention, the cache estimate is a relative estimate based on previously generated estimates and realized quantities of cache used. In other words, previous cache estimates and subsequent usage rates may be used to estimate future cache requirements.

For example, a previous client may have generated data using the same type of application as the current client. Based on the previous client's actual cache use rate, the coordination point may generate an estimate for the current client requesting to store data. Averaging, or other statistical methods, may be used to generate estimates when sufficient previous client data is available. For example, regression techniques or other modeling techniques may be used to create predictive functions to match the characteristics of current client to realized cache requirements from past clients.

The method may end following Step 438.

FIG. 4D shows a flowchart of a method in accordance with one or more embodiments of the invention. The method depicted in FIG. 4D may be used to select a remote backup storage in accordance with one or more embodiments of the invention. The method shown in FIG. 4D may be performed by, for example, a coordination point (140, FIG. 1). Other component of the system illustrated in FIG. 1 may perform the method of FIG. 4D without departing from the invention.

In Step 440, a portion of the remote backup storages that each have a cache capacity that is larger than the cache estimate is identified.

In one or more embodiments of the invention, the portion is identified by comparing the cache estimate to cache capacities of the gateway pools stored in a data structure, e.g., gateway pools cache capacities (320B, FIG. 3).

In Step 442, the remote backup storage of the portion having the smallest client load is used.

In one or more embodiments of the invention, the smallest client load is the fewest number of clients being served.

The method may end following Step 442.

Figure 5:
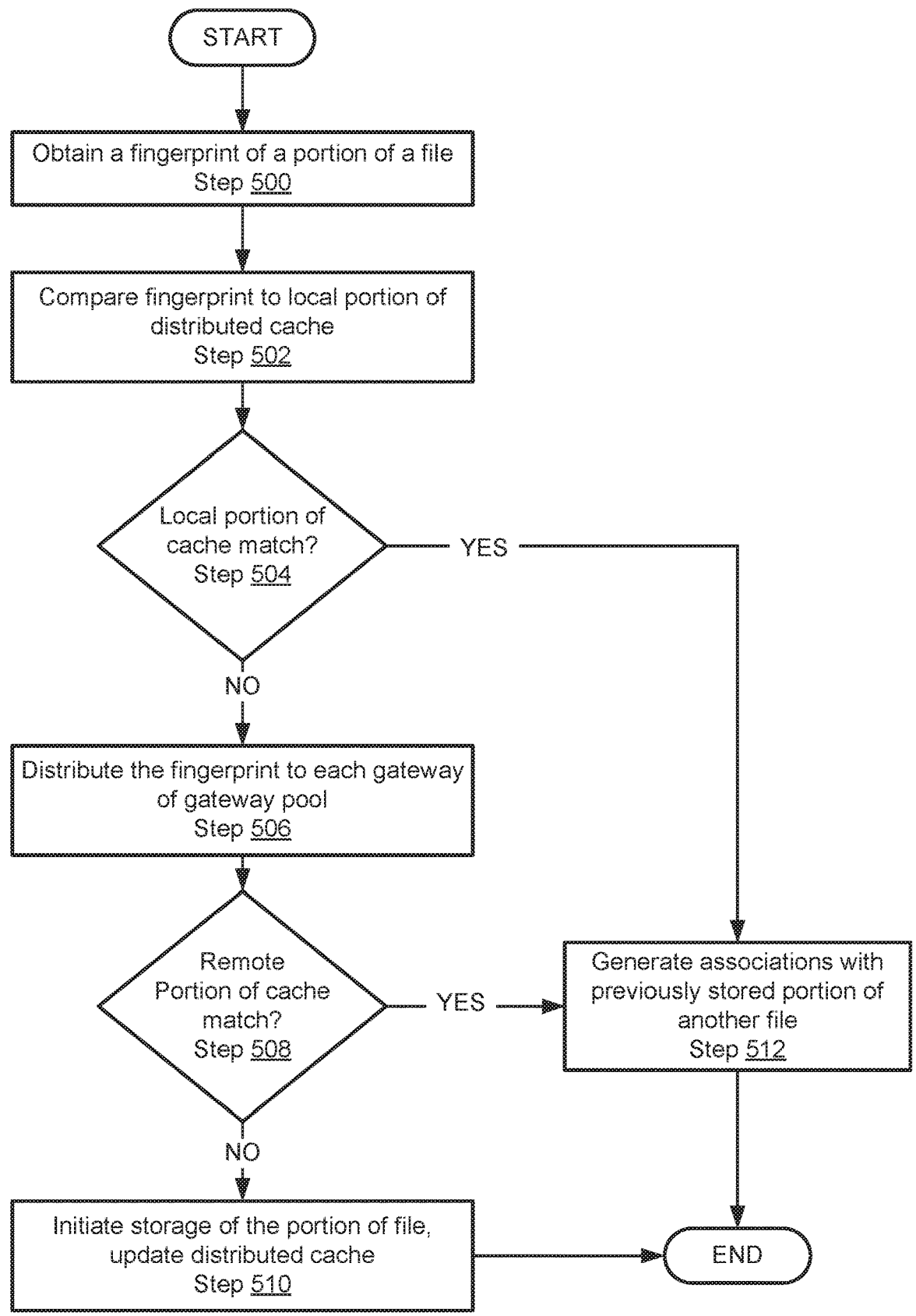
FIG. 5 shows a flowchart of a method of storing data in a backup storage in accordance with one or more embodiments of the invention.

As discussed above, the remote backup storages may provide storage services to clients. FIG. 5 shows a flowchart of a method in accordance with one or more embodiments of the invention. The method depicted in FIG. 5 may be used by a remote backup storage to store data in accordance with one or more embodiments of the invention. The method shown in FIG. 5 may be performed by, for example, a remote backup storage (100A, 100N, FIG. 1). Other component of the system illustrated in FIG. 1 may perform the method of FIG. 5 without departing from the invention.

In Step 500, a fingerprint of a portion of a file of the data is obtained by a gateway of a gateway group.

A fingerprint may be a hash of the portion of the portion of the file. The hash may be a SHA-1 hash.

In Step 502, the fingerprint is compared to a location portion of a distributed cache.

In one or more embodiments of the invention, the local portion of a distributed includes fingerprints of a portion of previously stored client data.

In one or more embodiments of the invention, the distributed cache is distributed across the gateways of the gateway pool.

In Step 504, it is determined whether the fingerprint matches any fingerprint stored in the local portion of the distributed cache. If the fingerprint matches any fingerprint, the method proceeds to Step 512. If the fingerprint does not match any fingerprint, the method proceeds to Step 506.

In Step 506, the fingerprint is distributed to each gateway of the gateway pool to which the gateway that originally-obtained the fingerprint belongs.

In Step 508, it is determined whether the distributed fingerprint matches any fingerprint stored in any remote portion of the distributed cache.

A remote portion of the distributed cache may be the cache of any gateway that received the distributed fingerprint.

If the distributed matches any fingerprint stored in any remote portion of the distributed cache, the method proceeds to Step 512. Otherwise, the method proceeds to Step 510.

In Step 510, storage of the portion of the file is initiated and the distributed cache is updated.

Storage may be initiated by sending the portion of the file to a storage set for storage.

The distributed cache may be updated by storing the fingerprint of the portion of the file in the distributed cache. The stored fingerprint may be associated with the portion of the file stored in the storage set.

The method may end following Step 510.

In Step 512, an association between a previously stored portion of another file is generated.

The generated association may associate the previously stored portion of another file with a recipe for the file of which the portion of the file is a part. The recipe for the file may specify identifiers each portion of a file stored in a storage set necessary to generate the file.

The method may end following Step 512.

Figure 6:
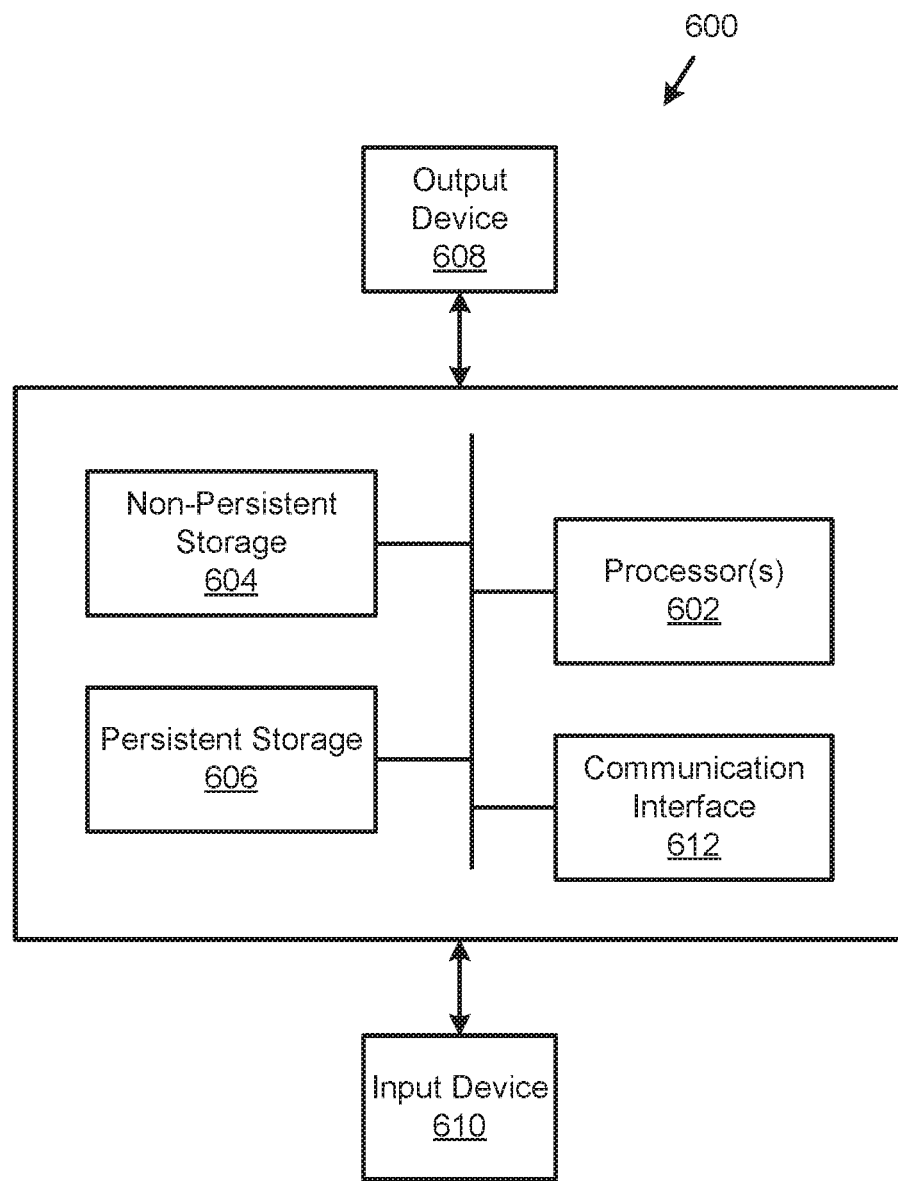
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may address the problem of data storage in a network environment. In a networked environment, client data may be stored in a range of storages. Storing the client data in a deduplicated storage imposes different computing resource usage loads on the system. For example, storing client data in a deduplicated storage may impose a high computing resource load when a gateway pool to the deduplicated storage does not have sufficient cache. If sufficient cache is not available, the gateway pool may have to obtain data from the deduplicated storage for basic operations of the deduplicated storage. Embodiments of the invention may dynamically adjust the quantity of cache in a gateway pool by assigning and/or reassigning gateways. Doing so increases the cache hit rate of the distributed cache of the gateway pool and, consequently, reduces the computing resources used by the gateway pool to perform basic operations of a deduplicated storage. Thus, embodiments of the invention may improve data storage in a network environment by reducing the computing resource cost of operating a deduplicated storage.

Further embodiments of the invention may provide for the generation of indirect cache estimates. As threats to data increase, all access to client data represents a threat to the data. Embodiments of the invention may provide a method of estimating a cache requirement for storing client data without accessing or otherwise interrogating the data. Rather, embodiments of the invention may provide an indirect cache estimate based on characteristics of the client that generated the data. In this way, embodiments of the invention may improve the likelihood of assigning the client to be serviced by a remote backup storage that has sufficient cache to service the request without requiring access to or interrogation of the client data. Accordingly, embodiments of the invention address the problem of data security in a network environment.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may enable one or more of the following: i) decrease a computing resource cost of performing deduplication by decreasing cache misses due to insufficient available cache and ii) improve data privacy/security by estimating the cache requirements of clients without interrogating client data.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A coordination point for assigning clients to remote backup storages, comprising:
   a persistent storage storing gateway pool cache capacities of the remote backup storages; and
   a processor programmed to:
      obtain a data storage request for data from a client of the clients;
      obtain an indirect cache estimate for servicing the data storage request;
      select a remote backup storage of the remote backup storages based on the obtained indirect cache estimate using the gateway pool cache capacities; and
      assign the selected remote backup storage to service the data storage request,
      wherein the selected remote backup storage has a higher client load at a time of the selection of the remote backup storage than a second client load of a second remote backup storage of the remote backup storages.

2. The coordination point of claim 1, wherein the processor is further programmed to:
   obtain a second data storage request for second data from a second client of the clients;
   obtain a second indirect cache estimate for servicing the second data storage request;
   make a determination that none of the remote backup storages have sufficient cache based on the obtained second indirect cache estimate using the gateway pool cache capacities;
   in response to the determination:
      assign a gateway to a third remote data storage;
      select the third remote backup storage after assigning the gateway; and
      assign the selected third remote backup storage to service the second data storage request.

3. The coordination point of claim 2, wherein assigning the gateway to the third remote data storage comprises:
   selecting an unassigned gateway; and
   distributing a portion of a distributed cache of the third remote data storage across a cache of the unassigned gateway.

4. The coordination point of claim 2, wherein assigning the gateway to the third remote data storage comprises:
   selecting an assigned gateway of a fourth remote data storage;
   removing a portion of a distributed cache of the fourth remote data storage from a cache of the selected assigned gateway; and
   distributing a portion of a distributed cache of the third remote data storage across the cache of the assigned gateway.

5. The coordination point of claim 1, wherein the processor is further programmed to:
   obtain a notification from the selected remote backup storage that the obtained indirect cache estimate underestimated an actual cache use by the client;
   in response to the notification:
      assign a gateway to the selected remote backup storage; and
      distribute a portion of a distributed cache of the selected remote data storage across a cache of the gateway.

6. The coordination point of claim 5, wherein the gateway was assigned to a third remote data storage before being assigned to the selected remote data storage.

7. The coordination point of claim 1, wherein the gateway pool cache capacities specifies cache capacities of distributed caches of the remote data storages.

8. The coordination point of claim 7, wherein each respective distributed cache is hosted by a plurality of gateways of a respective remote data storage of the remote data storages.

9. The coordination point of claim 1, wherein obtaining the indirect cache estimate for servicing the data storage request comprises:
   identifying a type of application generating the data.

10. The coordination point of claim 9, wherein obtaining the indirect cache estimate for servicing the data storage request further comprises:
    identifying a transaction rate of the identified type of application generating the data.

11. The coordination point of claim 1, wherein obtaining the indirect cache estimate for servicing the data storage request comprises:
    identifying a computing resource capacity of the client.

12. The coordination point of claim 1, wherein obtaining the indirect cache estimate for servicing the data storage request comprises:
    identifying an average available bandwidth between the client and the remote backup storages.

13. The coordination point of claim 1, wherein selecting the remote backup storage of the remote backup storages based on the obtained indirect cache estimate using the gateway pool cache capacities comprises:
    identifying a portion of the remote backup storages that have an available cache capacity that is larger than the obtained indirect cache estimate.

14. The coordination point of claim 13, wherein selecting the remote backup storage of the remote backup storages based on the obtained indirect cache estimate using the gateway pool cache capacities further comprises:
    identifying a remote backup storage of the portion of the remote backup storages that has a smallest client load; and using the identified remote backup storage of the portion of the remote backup storages as the selected remote backup storage.

15. The coordination point of claim 1, wherein the client load of the selected remote backup storage is a cardinality of a number of clients assigned to the selected remote backup storage.

16. The coordination point of claim 1, wherein the client load of the selected remote backup storage is a quantity of computing resources utilized by a number of the clients assigned to the selected remote backup storage.

17. A method of operating a coordination point for assigning clients to remote backup storages, comprising:
   obtaining a data storage request for data from a client of the clients;
   obtaining an indirect cache estimate for servicing the data storage request;
   selecting a remote backup storage of the remote backup storages based on the obtained indirect cache estimate using gateway pool cache capacities of the remote backup storages; and
   assigning the selected remote backup storage to service the data storage request,
   wherein the selected remote backup storage has a higher client load at a time of the selection of the remote backup storage than a second client load of a second remote backup storage of the remote backup storages.

18. The method of claim 17, further comprising:
   obtaining a second data storage request for second data from a second client of the clients;
   obtaining a second indirect cache estimate for servicing the second data storage request;
   making a determination that none of the remote backup storages have sufficient cache based on the obtained second indirect cache estimate using the gateway pool cache capacities;
   in response to the determination:
      assign a gateway to a third remote data storage;
      selecting the third remote backup storage after assigning the gateway; and
      assigning the selected third remote backup storage to service the second data storage request.

19. A non-transitory computer readable medium comprising computer readable program code, which when executed by a computer processor enables the computer processor to perform a method for assigning clients to remote backup storages, the method comprising:
   obtaining a data storage request for data from a client of the clients;
   obtaining an indirect cache estimate for servicing the data storage request;
   selecting a remote backup storage of the remote backup storages based on the obtained indirect cache estimate using gateway pool cache capacities of the remote backup storages; and
   assigning the selected remote backup storage to service the data storage request,
   wherein the selected remote backup storage has a higher client load at a time of the selection of the remote backup storage than a second client load of a second remote backup storage of the remote backup storages.

20. The non-transitory computer readable medium of claim 19, wherein the method further comprises:
   obtaining a second data storage request for second data from a second client of the clients;
   obtaining a second indirect cache estimate for servicing the second data storage request;
   making a determination that none of the remote backup storages have sufficient cache based on the obtained second indirect cache estimate using the gateway pool cache capacities;
   in response to the determination:
      assign a gateway to a third remote data storage;
      selecting the third remote backup storage after assigning the gateway; and
      assigning the selected third remote backup storage to service the second data storage request.

* * * * *